W. W. BROWN.
DEMOUNTABLE RIM.
APPLICATION FILED JAN. 31, 1918.
1,276,485.
Patented Aug. 20, 1918.
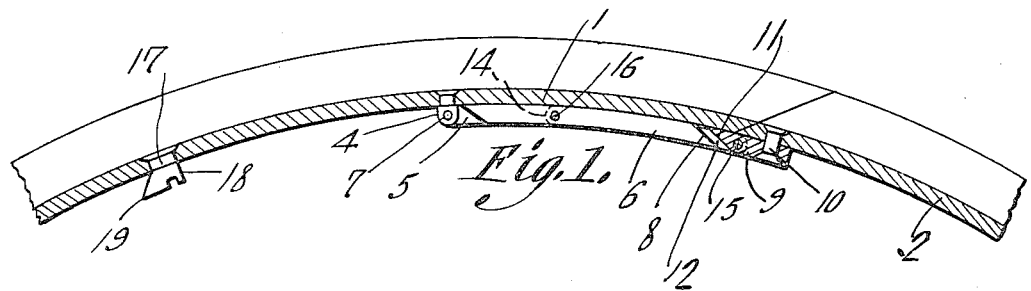
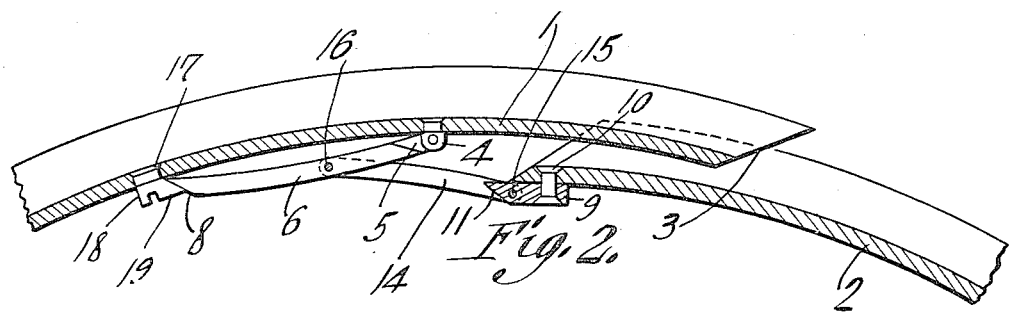
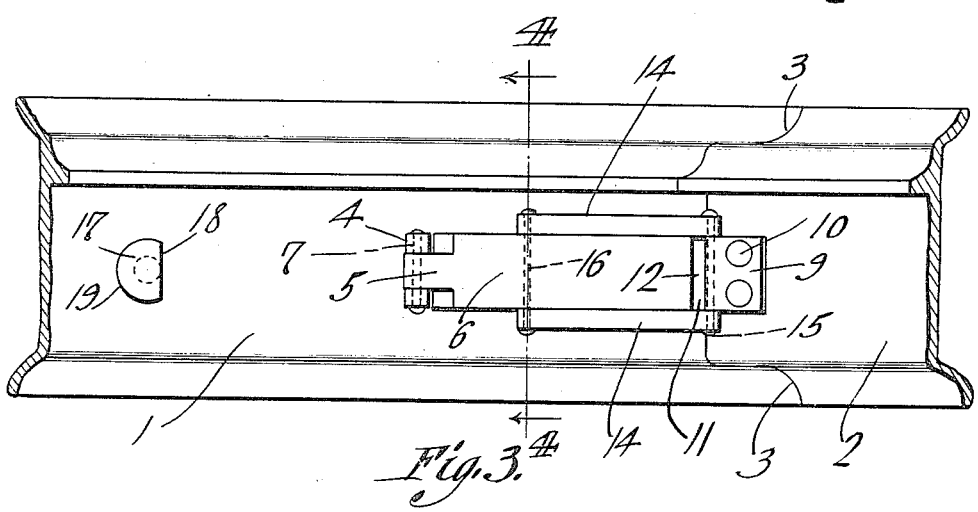
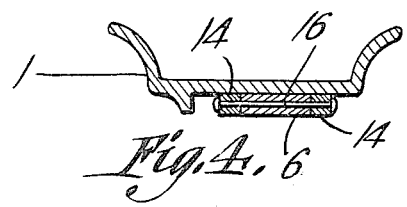
W. W. Brown
Inventor
Witness
By *(attorney signature)*
Attorney

UNITED STATES PATENT OFFICE.

WILLIAM WILSON BROWN, OF BURLINGTON, NORTH CAROLINA.

DEMOUNTABLE RIM.

1,276,485.

Specification of Letters Patent. Patented Aug. 20, 1918.

Application filed January 31, 1918. Serial No. 214,633.

*To all whom it may concern:*

Be it known that I, WILLIAM W. BROWN, a citizen of the United States, residing at Burlington, in the county of Alamance and State of North Carolina, have invented a new and useful Demountable Rim, of which the following is a specification.

The device forming the subject matter of this application is a demountable rim, and the invention aims to provide novel means for operating and controlling the relatively movable ends of the rim.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in longitudinal section, a portion of a rim embodying the present invention, the rim being in a closed position;

Fig. 2 is a similar view, wherein the rim is shown in an open position;

Fig. 3 is a bottom plan, showing a portion of the rim; and

Fig. 4 is a cross section, taken approximately on the line 4—4 of Fig. 3.

In the drawings, there is shown a portion of a wheel rim embodying relatively movable ends 1 and 2 which meet at a bevel as shown at 3. The end 1 of the rim is provided with projections 4, between which is received the reduced end 5 of a lever 6, the part 5 of the lever being pivoted to the projections 4, as indicated at 7. The opposite extremity of the lever 6 is beveled as shown at 8. A retainer or block 9 is attached by securing elements 10 to the end 2 of the rim and has a beveled end 11, coacting with the beveled portion 8 of the lever 6, and defining a recess 12, into which a tool (not shown) may be inserted, for the purpose of prying the lever 6 out of the closed position shown in Fig. 1. The numeral 14 denotes a pair of links. The links are in the form of bars, and are pivoted as indicated at 15 to the side portions of the retainer or block 9. As marked by the reference character 16, the links are pivoted to the lever 6, intermediate to the ends of the lever. When the lever 6 is in a closed position, the lever lies between the links 14, and presents, together with the links, a flat surface. A latch 17, which may be a screw, is journaled for rotation in the end 1 of the rim. A portion of the head of the screw is cut away, as shown at 18, to form a projection 19. When the lever 6 is swung to an open position, as shown in Fig. 2, thereby to contract the rim, the screw or latch 17 may be rotated, so that the projection 19 coöperates with the beveled end 8 of the lever.

The structure is simple in construction and includes but few parts, there being essentially no elements about the device which are likely to get out of order. The construction is such that severe usage may be withstood. The lever 6 folds between the links 14 and the inner curve of the rim is encumbered to a minimum extent. It is possible, however, by inserting a tool of any kind into the recess 12, to start the lever 6 toward an open position. The beveled part 8 of the lever exercises a double function, in that it coacts with the projection 19 on the latch 17, and coöperates, also, with the beveled end 11 of the retainer or block 9, to form a recess 12, into which a tool may be inserted, as hereinbefore stated.

Having thus described the invention, what is claimed is:

1. A wheel rim embodying relatively movable ends; links each pivoted at one extremity to one end of the rim and adapted to lie against the inner curve of the rim, said end of the rim being continuous between the links; a lever pivoted at one terminal to the other end of the rim; and means for pivotally connecting the other extremity of each link to the lever intermediate the terminals of the lever, the lever extending between the links, the distance between said means and the other terminal of the lever being less than the distance between said means and the pivoted extremities of the links, whereby said other terminal of the lever may be housed completely between the links.

2. A wheel rim embodying relatively movable ends; a retainer on one of said ends; a lever pivoted at one terminal to the other of said ends, the opposite terminal of the lever being spaced from the retainer to form a prize-tool seat, the retainer constituting a prize-tool fulcrum; and links pivoted to the outer sides of the retainer, and to the outer edges of the lever intermediate the terminals of the lever, said opposite terminal of the lever lying between the links.

3. A wheel rim embodying relatively movable ends; a retainer on one of said ends and provided with a beveled extremity; links each pivoted at one extremity to the retainer; a lever pivoted at one extremity to the other end of the rim and foldable to lie between the links, the other extremity of the lever being beveled to correspond with the beveled portion of the retainer, and being spaced therefrom, to define a tool receiving opening; means for pivotally connecting the other extremity of each link to the lever, intermediate the terminals of the lever; and a latch rotatable about said other end of the rim, the latch having a projection coacting with the beveled portion of the lever when the lever is swung backwardly against said other end of the rim.

In testimony that I claim the foregoing as my own, I have hereto affixed my signature in the presence of two witnesses.

WILLIAM WILSON BROWN.

Witnesses:
W. RAY BOONE,
M. S. YOUNG.